(12) United States Patent
Yallouz et al.

(10) Patent No.: US 11,552,882 B2
(45) Date of Patent: Jan. 10, 2023

(54) EFFICIENT PROPAGATION OF FAULT ROUTING NOTIFICATIONS

(71) Applicant: MELLANOX TECHNOLOGIES TLV LTD., Raanana (IL)

(72) Inventors: Jose Yallouz, Kibbutz Shaar Ha'Amakim (IL); Lion Levi, Yavne (IL); Gil Mey-Tal, Tel Aviv (IL); Daniel Klein, Netanya (IL)

(73) Assignee: MELLANOX TECHNOLOGIES, LTD., Yokneam (IL)

( * ) Notice: Subject to any disclaimer, the term of this patent is extended or adjusted under 35 U.S.C. 154(b) by 119 days.

(21) Appl. No.: 17/211,904

(22) Filed: Mar. 25, 2021

(65) Prior Publication Data

US 2022/0311702 A1    Sep. 29, 2022

(51) Int. Cl.
| | | |
|---|---|---|
| *H04L 12/703* | (2013.01) | |
| *H04L 12/721* | (2013.01) | |
| *H04L 12/707* | (2013.01) | |
| *H04L 12/717* | (2013.01) | |
| *H04L 45/28* | (2022.01) | |
| *H04L 45/42* | (2022.01) | |
| *H04L 45/00* | (2022.01) | |
| *H04L 45/12* | (2022.01) | |

(52) U.S. Cl.
CPC ............ *H04L 45/28* (2013.01); *H04L 45/123* (2013.01); *H04L 45/22* (2013.01); *H04L 45/42* (2013.01)

(58) Field of Classification Search
CPC ........ H04L 45/28; H04L 45/123; H04L 45/22
See application file for complete search history.

(56) References Cited

U.S. PATENT DOCUMENTS

| | | |
|---|---|---|
| 7,719,956 B2 | 5/2010 | Yamauchi |
| 7,965,621 B2 | 6/2011 | Farkas et al. |
| 8,619,546 B2 | 12/2013 | Nandagopal et al. |
| 8,923,112 B2 | 12/2014 | Farkas |
| 9,014,006 B2 | 4/2015 | Haramaty et al. |

(Continued)

OTHER PUBLICATIONS

Nvidia, "The SHIELD: Self-Healing Interconnect", White Paper, pp. 1-6, Oct. 2020.

(Continued)

*Primary Examiner* — Abdulkader M Alriyashi
(74) *Attorney, Agent, or Firm* — Kligler & Associates Patent Attorneys Ltd

(57) ABSTRACT

A network element includes processing circuitry and multiple ports. The ports connect using links to a communication network. The processing circuitry is configured to receive packets via the ports and forward the received packets to respective destination addresses via the ports. The destination addresses are organized in address groups, each address group including multiple destination addresses of (Continued)

nodes connected to a common network element in the communication network. The processing circuitry is further configured to, in response to identifying that a given port connects to a faulty link, determine one or more address groups that became unreachable via the given port due to the faulty link, generate a notification reporting one or more of the determined address groups that are unreachable via any port other than the given port, and transmit the notification to one or more other network elements, via one or more ports other than the given port.

12 Claims, 9 Drawing Sheets

(56) References Cited

U.S. PATENT DOCUMENTS

| | | | |
|---|---|---|---|
| 9,391,874 B2 | 7/2016 | Corti et al. | |
| 9,614,721 B2 | 4/2017 | Lu et al. | |
| 9,729,473 B2 | 8/2017 | Haramaty et al. | |
| 2002/0136163 A1* | 9/2002 | Kawakami | H04L 47/10 |
| | | | 370/229 |
| 2006/0062141 A1* | 3/2006 | Oran | H04L 12/2854 |
| | | | 370/216 |
| 2006/0133264 A1* | 6/2006 | Yamauchi | H04L 43/0805 |
| | | | 370/216 |
| 2012/0075988 A1* | 3/2012 | Lu | H04L 45/28 |
| | | | 370/218 |
| 2017/0244630 A1 | 8/2017 | Levy et al. | |

OTHER PUBLICATIONS

InfiniBand Trade Association, "InfiniBandTM Architecture Specification", vol. 1, Release 1.3, pp. 1-1842, Mar. 3, 2015.

Shpiner et al., "Dragonfly+: Low Cost Topology for Scaling Datacenters", 3rd IEEE International Workshop on High-Performance Interconnection Networks in the the Exascale and Big Data-Era (HIPINEB 2017), pp. 1-9, Feb. 2017.

Valadarsky et al., "Xpander: Towards Optimal-Performance Datacenters", Proceedings of the 12th International Conference on Emerging Networking Experiments and Technologies (CoNEXT '16 ), pp. 205-219, Dec. 12-15, 2016.

Besta et al., "Slim Fly: A Cost Effective Low-Diameter Network Topolgy", Proceedings of the International Conference for High Performance Computing, Networking, Storage and Analysis (SC'14), pp. 348-359, Nov. 16-21, 2014.

Singla et al., "Jellyfish: Networking Data Centers Randomly", The 9th (USENIX) Symposium on Networked Systems Design and Implementation (NSDI 12), pp. 225-238, year 2012.

* cited by examiner

EFFICIENT PROPAGATION OF FAULT ROUTING NOTIFICATIONS

TECHNICAL FIELD

Embodiments described herein relate generally to data communication, and particularly to methods and systems for efficient propagation of fault routing notifications.

BACKGROUND

Communication systems may suffer from various faults that degrade performance. For example, a link failure may result in losing data, in congestion or both.

Methods for mitigating performance degradation due to a link failure are known in the art. For example, U.S. Pat. No. 9,391,874 describes a method of re-routing traffic in a communications network in the event of a fault on a path across the network, the method comprising, determining whether a first node, located between the fault and a network ingress node, is capable of switching traffic to an alternative path, which avoids the fault, and if the first node is determined to be not so capable, then determining whether a second node, located upstream of the first node, is capable of switching traffic to an alternative path which avoids the fault.

As another example, U.S. Pat. No. 8,619,546 describes capability for coping with link failures in central control plane architectures. The capability for coping with link failures enables targeted reporting of link failures within the network in a manner that prevents flooding of link failure messages (LFMs) within the network. A method for reporting a failure of a link associated with a node includes detecting a failure of a link associated with the node, identifying an interface or the node associated with the failed link, identifying, from a flow table of the node, an ingress interface of the node via which a flow intended for the failed link is received, generating an LFM for the identified ingress interface, and sending the LFM via the identified ingress interface.

A white paper by Mellanox® Technologies, 2019, describes a solution called SHIELD™—(Self-Healing Interconnect Enhancement for Intelligent Datacenters), which takes advantage of the intelligence already built into the latest generation of InfiniBand switches. By making the fabric capable with self-healing autonomy, the speed with which communications can be corrected in the face of a link failure can be sped up by 5000×, fast enough to save communications from expensive retransmissions or absolute failure. Aspects of the SHIELD solution are described, for example, in U.S. Pat. No. 9,729,473.

SUMMARY

An embodiment that is described herein provides a network element that includes processing circuitry and multiple ports. The ports are configured to connect using links to a communication network. The processing circuitry is configured to receive packets via the ports and to forward the received packets to respective destination addresses via the ports. The destination addresses are organized in address groups, each address group including multiple destination addresses of end nodes connected to a common network element in the communication network. The processing circuitry is further configured to, in response to identifying that a given port connects to a faulty link, determine one or more address groups that became unreachable via the given port due to the faulty link, generate a notification reporting one or more of the determined address groups that are unreachable via any port other than the given port, and transmit the notification to one or more other network elements, via one or more ports other than the given port.

In some embodiments, the processing circuitry is configured to identify that the given port connects to a faulty link, in response to receiving a packet to be forwarded to the given port. In other embodiments, the processing circuitry is configured to identify that the given port connects to a faulty link independently of receiving any packet for forwarding to the given port. In yet other embodiments, the address groups are associated with respective unique address-group identifiers, and the processing circuitry is configured to report in the notification the address-group identifiers of the determined address groups.

In an embodiment, the processing circuitry is configured to hold a mapping that maps each port of the network element to respective address groups that are reachable via the port, and to determine the one or more address groups by mapping the given port to respective address groups using the mapping. In another embodiment, the processing circuitry is configured to, after transmitting the notification that reports a given address group, refrain from transmitting another not that reports the given address group.

There is additionally provided, in accordance with an embodiment that is described herein, a method, including, in a network element that includes multiple ports for connecting using links to a communication network, receiving packets via the ports and forwarding the received packets to respective destination addresses via the ports. The destination addresses are organized in address groups, each address group including multiple destination addresses of end nodes connected to a common network element in the communication network. In response to identifying that a given port connects to a faulty link, one or more address groups that became unreachable via the given port due to the faulty link are determined. A notification reporting one or more of the determined address groups that are unreachable via any port other than the given port is generated. The notification is transmitted to one or more other network elements, via one or more ports other than the given port.

There is additionally provided, in accordance with an embodiment that is described herein, a network element that includes processing circuitry and multiple ports. The multiple ports are configured to connect using links to a communication network. The processing circuitry is configured to receive packets via the ports and to forward the received packets to respective destination addresses via the ports. The destination addresses are organized in address groups, each address group including multiple destination addresses of end nodes connected to a common network element in the communication network. The processing circuitry is further configured to receive via a given port a notification reporting one or more address groups that became unreachable via the given port due to a link failure in another network element, and upon determining one or more address groups in the received notification that are unreachable via any port of the network element, to transmit an output notification reporting the determined address groups via one or more ports other than the given port.

In some embodiments, the processing circuitry is configured to, upon determining that a given address group in the notification is reachable via an alternative path, refrain from including the given address group in the output notification, and forward subsequent received packets that are addressed to the given address group via the alternative path. In other embodiments, the processing circuitry is configured to, in response to the notification, refrain from forwarding packets to be delivered to the determined address groups via the given port. In yet other embodiments, the processing circuitry is configured to receive a first notification followed by a second notification, both the first and the second notifications report a given address group that became unreachable via respective first and second ports, and in response to the first notification, to send an output notification reporting the given address group via the second port, before receiving the second notification.

In an embodiment, the processing circuitry is configured to report in the output notification address groups that are reachable only via ports having non-shortest paths to the respective address groups. In another embodiment, the processing circuitry is configured to assign, for a given address group, a high priority to ports having shortest paths to the given address group, and a low priority to ports having non-shortest paths to the given address group, and in response to receiving a notification that includes the given address group, to send an output notification reporting the given address group only via ports that are assigned to a low priority for the given address group.

In yet another embodiment, the communication network includes a topology selected from a list of topologies including: a Fat-Tree topology, a Clos topology, a DragonFly Plus topology, and an Xpander topology.

There is additionally provided, in accordance with an embodiment that is described herein, a method, including, in a network element that includes multiple ports for connecting using links a communication network, receiving packets via the ports and forwarding the received packets to respective destination addresses via the ports. The destination addresses are organized in address groups, each address group including multiple destination addresses of end nodes connected to a common network element in the communication network. A notification is received via a given port, the notification reporting one or more address groups that became unreachable via the given port due to a link failure in another network element. Upon determining one or more address groups in the received notification that are unreachable via any port of the network element, an output notification reporting the determined address groups is transmitted via one or more ports other than the given port.

These and other embodiments will be more fully understood from the following detailed description of the embodiments thereof, taken together with the drawings in which:

DETAILED DESCRIPTION OF EMBODIMENTS

Overview

Figure 1:
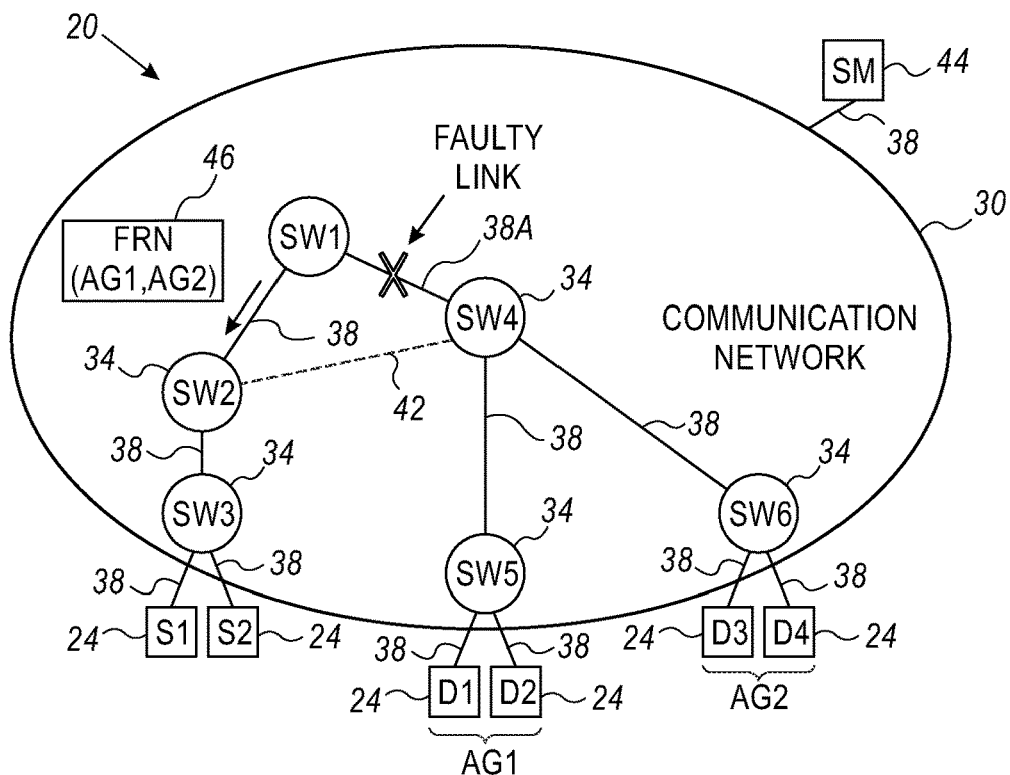
FIG. 1 is a block diagram that schematically illustrates a computer network that supports notification-based recovery from a link failure, in accordance with an embodiment that is described herein.

Embodiments that are described herein provide improved methods and systems for recovering from a link failure in a communication network.

A communication network is typically built from multiple network elements interconnected by links in some topology. When a link in the network fails, any path between a pair of network nodes coupled to the network that includes the failing link becomes "broken". This situation may persist until alternative paths to the destinations are established.

In principle, a central entity coupled to the network may detect or be notified of a faulty link, and in response, reconfigure one or more of the network elements to create alternative paths to the destinations. Recovery methods that are based on a centralized entity, however, typically react slowly, e.g., on the order of seconds or even minutes (depending on the recovery method used), to re-establish an alternative path, which may degrade network reliability.

In the disclosed embodiments, a network element holds information regarding one or more groups of destination addresses that are respectively reachable by each of the ports of the network element. When a link coupled to a given port fails, the network element triggers the transmission of fault notifications to neighbor network elements coupled to other ports of the network element. The fault notifications may further propagate to other network elements in the network until establishing an alternative path to each address group that became unreachable due to the faulty link. Each network element that participates in this protocol sends a notification for a given address group only once, therefore limiting the maximal number of fault notifications sent.

The propagation of fault notifications continues until all source nodes that had paths to respective destination nodes via a given link before the link failed have alternative paths to the destination nodes skipping the given link after it has failed.

In the description that follows, a network element that locally detects a faulty link and in response initiates the transmission of fault notifications is referred to as an "initiator," whereas a network element that receives a fault notification in response to a link failure in another network element is referred to as a "receiver."

In some embodiments, a network element identifies that a given port connects to a faulty link in response to receiving a packet to be forwarded to the given port. Alternatively, the network element detects the faulty link, e.g., by monitoring the link state, independently of receiving any packet for forwarding to the given port.

In the description that follows, the phrase "sending packets to an address group" (or similar phrasing) means sending the packets to network nodes whose destination addresses belong that address group.

Address groups may be identified in various ways. In some embodiments, the address groups are associated with respective unique address-group identifiers having compact representation, and the network element reports in the notification the address-group identifiers of the relevant address groups.

When a link at a given port fails, the network element needs to know which address groups became unreachable due to the failure. To this end, in some embodiments, the network element holds a mapping that maps each port of the network element to respective address groups that are normally reachable via the port. In such embodiments, the network element determines address groups that became unreachable (due to the faulty link), by mapping the given port to respective address groups using the mapping.

Recovering from a link failure by propagating fault notifications may result in "flooding" the network. To prevent this, in some embodiments, after transmitting a notification that reports a given address group, the network element refrains from transmitting another notification that reports the same address group.

In an embodiment, the network element functions as a receiver that receives a fault notification via a given port. Upon determining that a given address group in the notification is reachable via an alternative path (via another port), the network element refrains from including the given address group in an output notification, and forwards subsequent received packets that are addressed to the given address Group via the alternative path. The network element also refrains from forwarding packets addressed to the determined address groups, via the given port that connects to the faulty link.

In some embodiments, the network element receives multiple notifications that are all reporting a common address group. For example, the network element receives a first notification and a second notification that both report a given address group that became unreachable via respective first and second ports. Assume, for example, that the network element receives the first notification before receiving the second notification. In this case, in response to receiving the first notification, the network element sends an output notification reporting the given address group, via the second port, before receiving the second notification.

In some embodiments, in an approach that is referred to herein as a "shortest path" approach, only shortest paths may serve as alternative paths. In such embodiments, the network element reports in the output notification only address groups that are reachable via ports having non-shortest paths to the respective address groups.

In some embodiments, in an approach that is referred to herein as a "priority-based" approach, for a given address group, the network element assigns a high priority to ports having shortest paths to the given address group, and a low priority to ports having non-shortest paths to the given address group. In response to receiving a notification that includes the given address group, the network element sends an output notification reporting the given address group, only via ports that are assigned to a low priority for the given address group. It should be noted that some paths that are eliminated in the shortest path approach are retained in the priority-based approach.

The disclosed embodiments are applicable to various topologies such as, but not limited to, a Fat-Tree topology, a Clos topology, a DragonFly Plus topology, and an Xpander topology.

In the disclosed techniques, a given network element notifies other network elements of address groups that became unreachable via the given network element due to a faulty link. Handling the notifications at a resolution of address-groups rather than reporting individual destination addresses is very efficient and requires very little processing power in the network elements. Moreover, in each network element, a relevant address group is reported only once, which prevents notification flooding. The methods involved in the initiation of propagation of fault notifications across network elements of the topology can be viewed as performing a notification protocol. This protocol converges to a state in which all source nodes have alternative paths to their destination nodes, skipping the faulty link. The convergence time of the protocol is much faster compared to recovering from the link failure by a central entity.

System Description

FIG. 1 is block diagram that schematically illustrates a computer network 20 that supports notification-based recovery from a link failure, in accordance with an embodiment that is described herein.

In computer network 20, network nodes 24 communicate with one another over a communication network 30. Communication network 30 may comprise any suitable communication network having any suitable topology and operating under any suitable protocols. For example, communication network 30 may comprise an Ethernet network or an InfiniBand fabric.

Computer network 20 may be used in various applications such as in Cloud applications, in AI applications and in a High-Performance Computing (HPC) environment.

In the present example, network nodes 24 denoted S1 and S2 function as source nodes, whereas network nodes 24 denoted D1 . . . D4 function as destination nodes. In this configuration, each of source nodes S1 and S2 can sends data to each of destination nodes D1 . . . D4. In a practical application, computer network 20 typically comprises thousands of network nodes 24, each of which serving both as a source node and as a destination node.

Communication network 30 comprises multiple network elements 34 that connect to one another and to network nodes 24 using links 38. Network elements 34 may comprise any suitable type of a network elements that forward packets in communication network 30, such as, for example, a network switch or a router. In the example of FIG. 1, network elements 34 comprise network switches denoted SW1 . . . SW6.

In FIG. 1, source nodes S1 and S2 communicate with destination nodes D1 and D2 via a path in the communication network comprising switches SW3, SW2, SW1, SW4 and SW5. Similarly, source nodes S1 and S2 communicate with destination nodes D3 and D4 via a path comprising SW3, SW2, SW1, SW4 and SW6. Note that in addition to the path segment from SW2 to SW4 via S1, the network has an alternative path segment 42 from SW2 to SW4 that skips SW1. Alternative path segment 42 is depicted in the figure in a dotted line and may comprise a direct link 38, or one or more network elements 34 interconnected by links 38.

A central entity 44 is coupled to communication network 30. Central entity 44 may comprise, for example, a Subnet Manager (SM) or any other suitable computer or server used for managing communication network 30. Among other tasks, central entity 44 configures network elements 34 with forwarding information that specifies forwarding rules to be applied to incoming packets. In some embodiments, central entity 44 detects or is notified of a faulty link 38 in communication network 30. In response to the faulty link central entity 44 reconfigures one or more network elements 34 for establishing an alternative path to the destination. Recovery from a link failure by the central entity is, however, typically slow (e.g., on the order of seconds or even minutes, depending on the underlying protocol used), which degrades network reliability.

In the disclosed embodiments, a network element that connects to a faulty link sends to its neighbors a notification specifying one or more groups of destination addresses that became unreachable via the given network element. A neighbor network element receiving the notification, starts using an alternative path to the destination, when available, or propagates another notification to its neighbors.

In the disclosed embodiments, destination addresses of end nodes are arranged in groups. As will be described below, a link failure is notified in terms of address groups and not in terms of individual destination addresses, which makes the notification mechanism very efficient. In the present context and in the claims, an "address group" (AG) comprises multiple destination addresses of end nodes connected to a common network element in the communication network.

In some embodiments, the address groups are associated with respective address-group identifiers. In general, identifiers of address groups can be derived from the structure of the underlying topology. For example, in a Fat-Tree topology, an address group may be associated with all the servers that are connected to a Top of a Rack (ToR) switch, or even with all servers connected to a pod in the topology. In the example of FIG. 1, an address group comprising the destination addresses of network nodes and D2 is denoted AG1, and an address group comprising the destination addresses of network nodes D3 and D4 is denoted AG2.

Assume, for example, that link 38A between SW1 and SW4 fails. Consequently, SW1 can no longer send packets to the network nodes whose destination addresses belong to AG1 or AG2. Responsively to detecting the link failure, SW1 blocks forwarding packets addressed to AG1 and AG2 via the port connected to link 38A, e.g., by updating its forwarding table. In addition, SW1 sends a notification 46 reporting AG1 and AG2 to all neighbor network elements excluding SW4. The notification is denoted FRN(AG1, AG2)—a Fault Routing Notification (FRN) reporting address groups AG1 and AG2.

In the present example, in response to receiving notification 46, SW2 starts forwarding packets addressed to AG1 and AG2 via the alternative segment path 42 instead of via SW1. Since SW2 has an alternative path to AG1 and AG2, SW2 need not further propagate any notifications.

Figure 2:
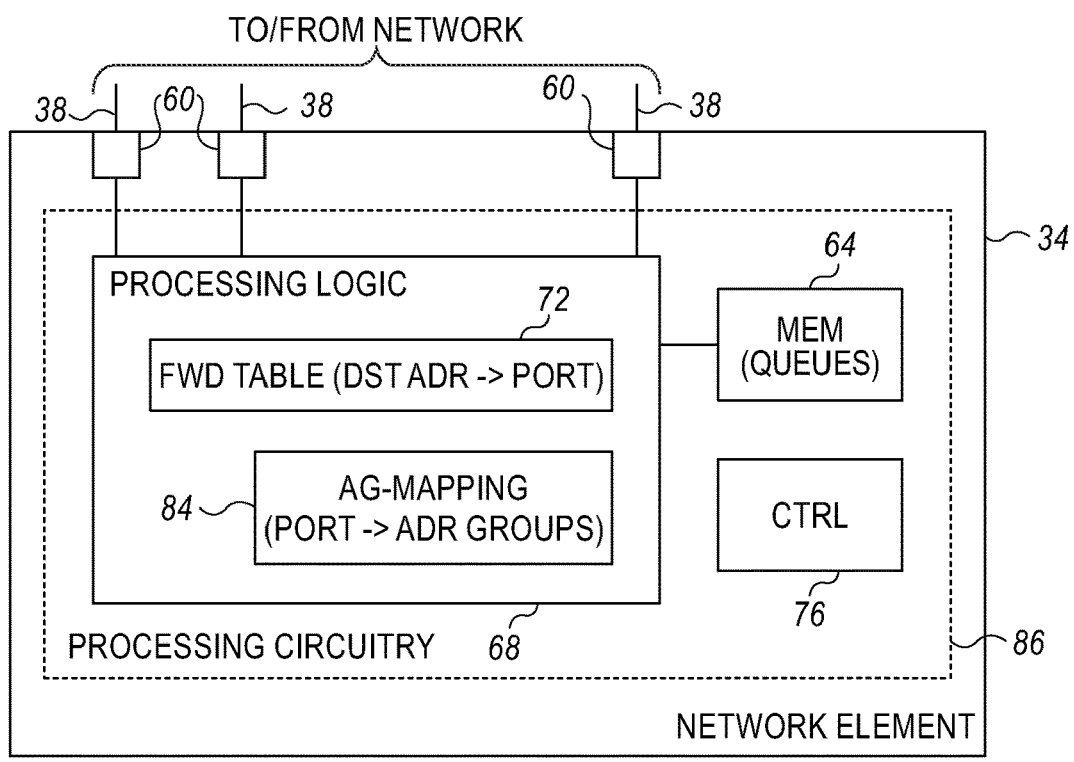
FIG. 2 is a block diagram that schematically illustrates a network element that can be used in a network of the computer network of FIG. 1, in accordance with an embodiment that is described herein.

FIG. 2 is a block diagram that schematically illustrates network element 34 that can be used in a network of computer network 20 of FIG. 1, in accordance with an embodiment that is described herein.

Network element 34 comprises multiple ports 60 that are configured to connect to communication network 30 using links 38. Specifically, depending on its position in the underline topology, network element 34 may connect to other network elements 34, to network nodes 24, to central entity 44, and/or to any other element of the communication network.

Network element 34 comprises a memory 64 and processing logic 68. Memory 64 stores queues of received packets, ant typically also other data. Processing logic 68 processes incoming packets and forwards them, e.g., using a forwarding table 72. The forwarding table translates between destination addresses and respective an output ports of the network element. In some embodiments, the forwarding table maps a destination address, e.g., written in a header of an incoming packet, into a port 60 having a path to that destination address in the communication network. In some embodiments, for a given packet, the network element 34 has multiple paths via multiple respective ports to the same destination address. In such embodiments, processing logic 68 determines which of the available paths to use for each packet, e.g., based on a flow to which the packet belongs.

Network element 34 comprises a switch controller 76, which performs the various management tasks and some of the packet processing functions of network element 34. For example, switch controller 76 configures forwarding table 72 to apply the desired routing plan. By controlling the routing plan, network element 34 can cause the packets to traverse various paths through communication network 30.

In some embodiments, processing logic 68 monitors the link states of links 38. In response to detecting that a link connected to a given port has failed, processing logic generates a notification (e.g., a FRN) that reports address groups (AGs) that became unreachable via the given port due to the link failure. An AG-mapping 84 maps between ports and AGs that are accessible via the ports when all links are operative. In some embodiments, processing logic 68 maps the port of the faulty link to respective address groups using AG-mapping 84 and includes the mapped AGs in the FRN. In some embodiments, the FRN reports compact address-group identifiers of the relevant AGs. Processing logic 68 transmits the FRN to its neighbor network elements as described above.

In some embodiments, a network element 34 receives from another network element a FRN reporting one or more unreachable AGs. As will be described in detail below, the network element identifies AGs in the received FRN for which there is no alternative path via any of the ports and transmits an FRN that reports identified AGs to its neighbor network elements (excluding the network element from which the FRN was received).

The configurations of computer network 20 in FIG. 1 and network element 34 in FIG. 2 are example configurations, which are chosen purely for the sake of conceptual clarity. In alternative embodiments, any other suitable computer network and network element configurations can also be used. The different elements of network element 34 may be implemented in hardware, such as using one or more Application-Specific Integrated Circuits (ASICs) or Field-Programmable Gate Arrays (FPGAs). In alternative embodiments, some elements of network element 34, e.g., processing logic 68 and/or switch controller 76, may be implemented in software executing on a suitable processor, or using a combination of hardware and software elements.

Memory 64 may comprise any suitable storage device of any suitable storage technology. For example, memory 64 may comprise a Random-Access Memory (RAM) or a Nonvolatile memory such as a Flash memory.

Elements that are not necessary for understanding the principles of the present application, such as various interfaces, addressing circuits, timing and sequencing circuits and debugging circuits, have been omitted from FIGS. 1 and 2 for clarity.

In some embodiments, processing logic 68 and/or switch controller 76 may comprise general-purpose processors, which are programmed in software to carry out the network manager and/or switch functions described herein. The software may be downloaded to the processors in electronic form, for example, over a network, or it may, alternatively or additionally, be provided and/or stored on non-transitory tangible media, such as magnetic, optical, or electronic memory.

In the present context and in the claims, elements of network element excluding ports 60 are collectively referred to as "processing circuitry" 86. In the example network element of FIG. 2, the processing circuitry comprises processing logic 68, memory 64 and switch controller 76.

Methods for Recovering from a Link Failure Using Fault Routing Notifications

Figure 3:
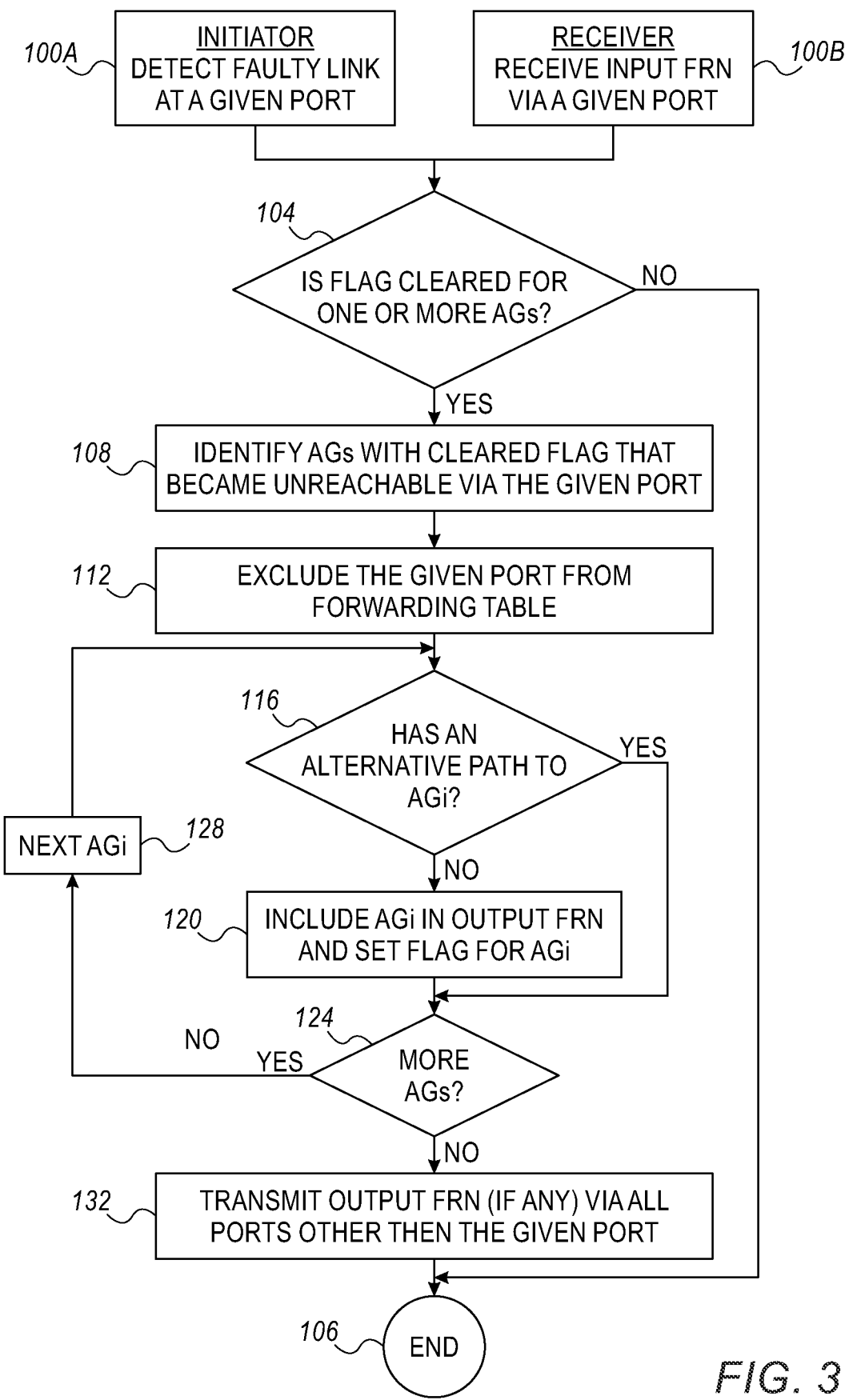
FIG. 3 is a flow chart that schematically illustrates a method for notifying neighbor network elements of address groups that became unreachable due to a link failure, in accordance with an embodiment that is described herein.

FIG. 3 is a flow chart that schematically illustrates a method for notifying neighbor network elements of address groups that became unreachable due to a link failure, in accordance with an embodiment that is described herein.

The method will be described as executed by processing logic 68 of network element 34 of FIGS. 1 and 2 above.

In describing the method of FIG. 3 it is assumed that AG-mapping 84 of the network element is configured to map each port of the network element to respective one or more destination AGs that are reachable via that port. It is further assumed that forwarding table 72 holds information for translating destination addresses to respective output ports. Forwarding table 72 maps all the destination addresses of a given AG to a common port.

In some embodiments, network element 34 manages a flag per AG. The flag is initially cleared, and is set responsively to sending a FRN that reports the AG associated with the flag. The network element refrains from sending FRNs for an AG while the corresponding flag is set. This mechanism is important for limiting the total number of FRNs sent until establishing alternative paths to the destination AGs. In alternative embodiments, other suitable methods for sending a FRN only once per AG in a network element can also be used.

The method of FIG. 3 begins with processing logic 68 detecting a faulty link associated with a given port, at a fault detection step 100A, or with receiving a FRN from a neighbor network element via a given port, at a FRN reception step 100B. At step 100A, the processing logic may detect the faulty link in response to receiving a packet to be delivered via the faulty link, or independently of any packet reception. The network element executing step 100A or 100B is also referred to as an "initiator" or a "receiver," respectively.

At a flag checking step 104, the processing logic checks whether the flag of at least one AG among the AGs that became unreachable due to the faulty link (at step 100A) or among the AGs reported in the received FRN (at step 100B) is cleared. When all relevant flags are set, the processing logic proceeds to a termination step 106 and the method terminates. Otherwise, there are one or more AGs not yet reported by the network element in any FRN, and the processing logic proceeds to an AGs identification step 108. At step 108, processing logic 68 identifies AGs that became unreachable via the given port and that their corresponding flags are cleared. In some embodiments, the processing logic identifies the AGs at step 108 by mapping an identifier of the given port to one or more AG identifiers of the unreachable AGs, using AG-mapping 84.

At a table updating step 112, the processing logic updates forwarding table 72, by excluding from the forwarding table information used for forwarding packets to the given port. This means that all traffic that normally flows toward the corresponding AGs via the given port is now blocked.

At an alternative path query step 116 the processing logic checks whether the network element has an alternative path to reach the destination addresses of AGi, wherein AGi denotes the $i^{th}$ AG among the AGs identified at step 108. When at step 116 the network element has no alternative path, the processing logic includes AGi in an output FRN and sets the flag of AGi, at a reporting step 120. Following step 116 or 120, the processing logic proceeds to a loop handling step 124, to check whether all the AGs that were identified at step 108 were processed. When there are still AGs to process, the processing logic selects a subsequent AGi at an AG selection step 128, and loops back to step 116 to check for an alternative path. Otherwise processing logic 68 proceeds to a notification transmission step 132 to transmit the output FRN (if any) produced by looping over step 120 as described above. The processing logic transmits the output FRN a step 132 via all ports other than the given port. Following step 132, the method terminates at step 106.

In the method of FIG. 3, an initiator network element generates a first FRN that is later propagated by network elements operating as receivers. In the present context, the term "notification propagation" refers to the process carried out by an initiator or a receiver network element sending an FRN to neighbor network elements. Depending on the availability of alternative paths, a receiver network element that receives an FRN may (i) refrain from sending any FRN when having an alternative path to each of the AGs reported in the received FRN, or (ii) send an FRN containing AGs reported in the received FRN that have no alternative paths. A receiver network element may generate the output FRN by manipulating the received FRN or by copying information from the received FRN to the output FRN.

At step 116 of the method of FIG. 3, the processing logic checks for alternative paths. As will be described in detail below, in some embodiments, additional constraints may also be used, e.g., checking whether an alternative path comprises a shortest path, or classifying alternative paths based on preassigned priorities.

Applying the method of FIG. 3 in a communication network results in an efficient notification protocol. The protocol is triggered by a network element detecting a faulty link and converges when all source nodes have alternative paths to their destination nodes that skip the faulty link (when such convergence is possible). For a given topology, the total number of fault notifications sent until the protocol converges is upper bounded by the number of links in the topology between pairs of network elements. Moreover, the time required to propagate the fault notifications to all relevant network elements is upper bounded by a time duration that is proportional to the network diameter.

Recovering from a Link Failure in a Fat-Tree Topology

Figure 4A:
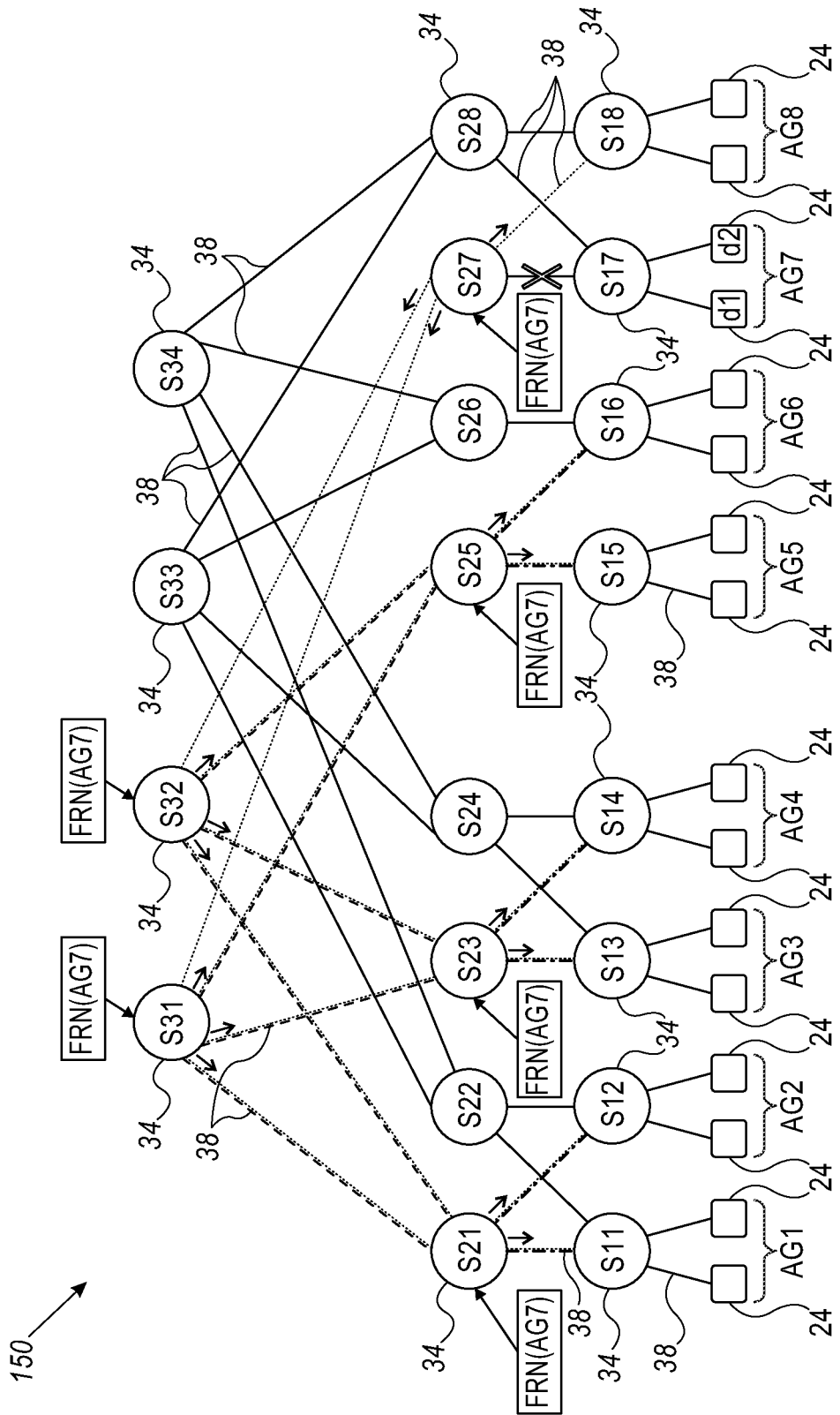
FIGS. 4A and 4B are diagrams that schematically illustrate methods for recovering from a link failure in a communication network having a Fat-Tree topology, in accordance with embodiments that are described herein.
Figure 4B:
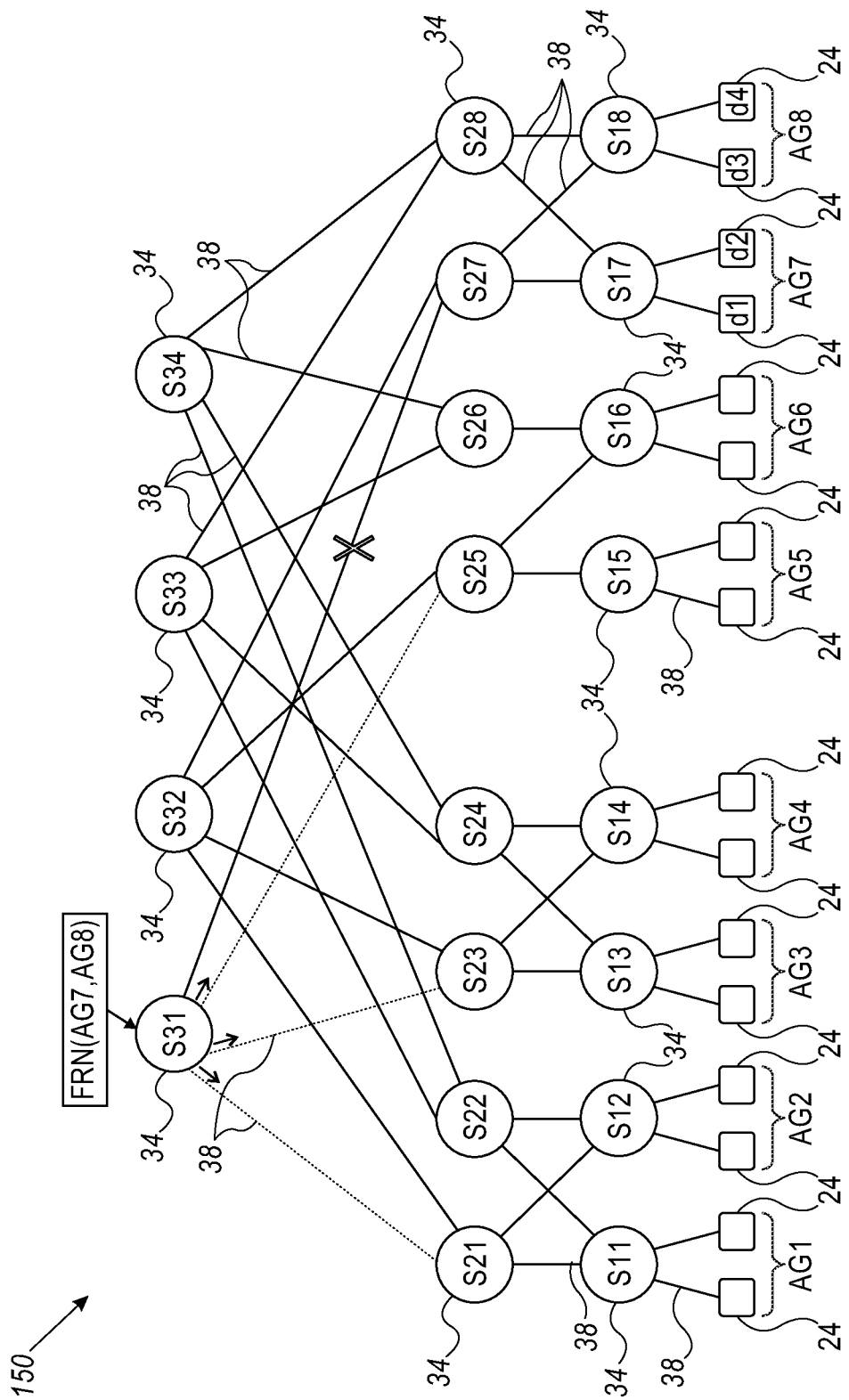

FIGS. 4A and 4B are diagrams that schematically illustrate methods for recovering from a link failure in a communication network 150 having a Fat-Tree topology, in accordance with embodiments that are described herein.

In FIGS. 4A and 4B, network elements 34 are interconnected using links 38, in a three-level Fat-tree topology. In the present example, network elements 34 comprise network switches. The topology in FIGS. 4A and 4B can also be viewed as a special case of the Clos topology. The lower level of the topology comprises eight network elements 34 denoted S11 . . . S18, the middle level comprises eight network elements 34 denoted S21 . . . S28, and the upper level comprises four network elements 34 denoted S31 . . . S34. In FIGS. 4A and 4B, only part of the network elements and links are numbered, for the sake of figure clarity. In describing FIGS. 4A and 4B it is assumed that network elements 34 comprise network switches. This assumption, however, is not mandatory, and other types of network elements such as routers can also be used.

In the present example, each switch in the lower level is connected directly to network nodes 24 using links 38. A switch that connects directly to network nodes is also referred to as a Top of the Rack (ToR) switch. In the example of FIGS. 4A and 4B, each ToR switch connects to two network nodes 24. In practical implementations, however, a ToR switch typically connects to tens of network nodes. The actual number of network nodes per ToR switch depends on the radix of the switch (i.e., the overall number of ports). ToR switches are sometimes connected so that halt of the ports connect to network nodes (e.g., using network adapters) and the other half to other switches in the topology.

Network nodes 24 are preassigned respective destination addresses. For example, in a subnet comprising an Infini-Band fabric, each network node is assigned a unique Destination Local Identifier (DLID), whereas in an Ethernet network each network node comprises a respective MAC address.

As noted above, the destination addresses are arranged in groups denoted Address Groups (AGs), each of which comprising the destination addresses of network nodes 24 that are coupled to a common switch 34. In the example of FIGS. 4A and 4B, network nodes 24 coupled to switches S11 . . . S18 are associated with respective AGs denoted AG1 . . . AG8, wherein each of the AGs comprises two destination addresses of the relevant network nodes.

Next are described example scenarios of recovering from link failures using the method of FIG. 3 above.

FIG. 4A refers to a scenario in which the link between switch S27 of the second level and switch S17 of the first level fails, as indicated by an "X" symbol depicted on the faulty link. In this example, destination nodes denoted d1 and d2 that are connected to S17 become unreachable via S27 (but are still reachable via S28).

In response to detecting the faulty link, S27 blocks in its forwarding table, forwarding packets to S17. S27 further checks whether it has an alternative path to AG7. Since S27 has no alternative path to S17 (and therefore no alternative path to d1 and d2 in AG7), S27 (as an initiator) transmits a FRN reporting AG7 to its neighbors via all ports other than the port connected to S17. S27 also sets the flag corresponding to AG7. In this example, FRN(AG7) notifies switches S31, S32 and S18 that the destination addresses of AG7 cannot be reached via S27.

As a received, switch S18 has a path to S17 via S28 and therefore ignores the notification FRN(AG7). On the other hand, none of S31 and S32 has an alternative path to S17. Consequently, each of S31 and S32 propagates a FRN(AG7) notification to its neighbor switches, via all ports other than the port via which the FRN(AG7) was received. Specifically, each of S31 and S32 transmits a FRN(AG7) to S21, S23 and S25. Note that each of S31 and S32 transmits a FRN(AG7) independently of the other switch.

Each of switches S21, S23 and S25 receives a FRN(AG7) from S31 and another FRN(AG7) from S32. Assume, for example, that S21 first receives the FRN(AG7) sent by S31. Consequently, S21 stops forwarding packets to S31, but not to S32. Moreover, until receiving a FRN(AG7) from S32, the link from S21 to S32 is still considered operative, and therefore S21 does not transmit any FRNs to its neighbor switches and does not set the flag of AG7. When S21 later receives a FRN(AG7) from S32, switch S21 identifies that it has no alternative path to AG7, and therefore stops forwarding packets to S32, transmits a FRN(AG7) to S11 and S12, and sets the flag of AG7. Since each of S11 and S12 has a path to destination addresses d1 and d2 of AG7, via S22, S34, S28 and S17, S11 and S12 refrain from further propagating any FRNs.

FIG. 4B refers to a scenario in which the link between switch S31 of the upper level and switch S27 of the second level and has failed, as indicated by an "X" symbol. Because of the faulty link, destination network nodes d1, d2 that are connected to S17 and d3, d4 that connected to S18 are unreachable via S31.

S31 detects the faulty link toward S27, but since S31 has no alternative path to S27 (and therefore no alternative path to d1 . . . d4 in AG7 and AG8), S31 transmits a FRN reporting both AG7 and AG8 to its neighbors via all ports other than the port of the faulty link. S31 also blocks forwarding packets to S27 and sets the flags of AG7 and AG8. The FRN(AG7, AG8) notifies the neighboring switches that AG7 and AG8 cannot be reached via S31.

In the example of FIG. 4B, S31 transmits FRN(AG7, AG8) to S21, S23 and S25. In response to the FRN, each of S21, S23 and S25 blocks forwarding packets to S31 via the port from which the FRN was received. Each of S21, S23 and S25 however, has an alternative path to S27 via S32, and therefore sends no further FRNs.

It can be shown that the convergence time in a Fat-Tree topology having a height 'h' (i.e., h+1 levels is upper bounded by a time-duration proportional to 2 h. When the link failure occurs at a level 'l', wherein l≤h, the convergence time is proportional to (2 h−2l+1).

Criteria for Performing FRN Propagation

In some topologies, a given link is shared by multiple paths. This may occur, for example, in a DragonFly Plus topology. In this case, a network element that receives an FRN reporting an AG may have an alternative path to that AG via the common link and therefore fails to send FRNs to its neighbors. In some embodiments, various constrains may be imposed on alternative paths in handling FRNs, as will be described in detail below. Two different approaches referred to as a "shortest path" and "priority-based" are now described.

In some embodiments, to implement the shortest path approach, step 116 in the method of FIG. 3 is modified to query whether the network element has an alternative path that is a shortest path to AGi. When there is a shortest path to AGi, the network element may use this path, and therefore AGi is not included in the output FRN. Otherwise, all alternative paths to AGi (if any) are non-shortest paths, and the processing logic includes AGi in the FRN to be sent via all other ports at step 132. It should be noted that the shortest path method is applicable to both initiator and receiver network elements.

In the priority-based approach, ports associated with the AGs are assigned respective priorities. In some embodiments, a port is assigned a high priority when having a shortest path to a destination AG, and a low priority when having a non-shortest path to the destination AG.

Figure 5:
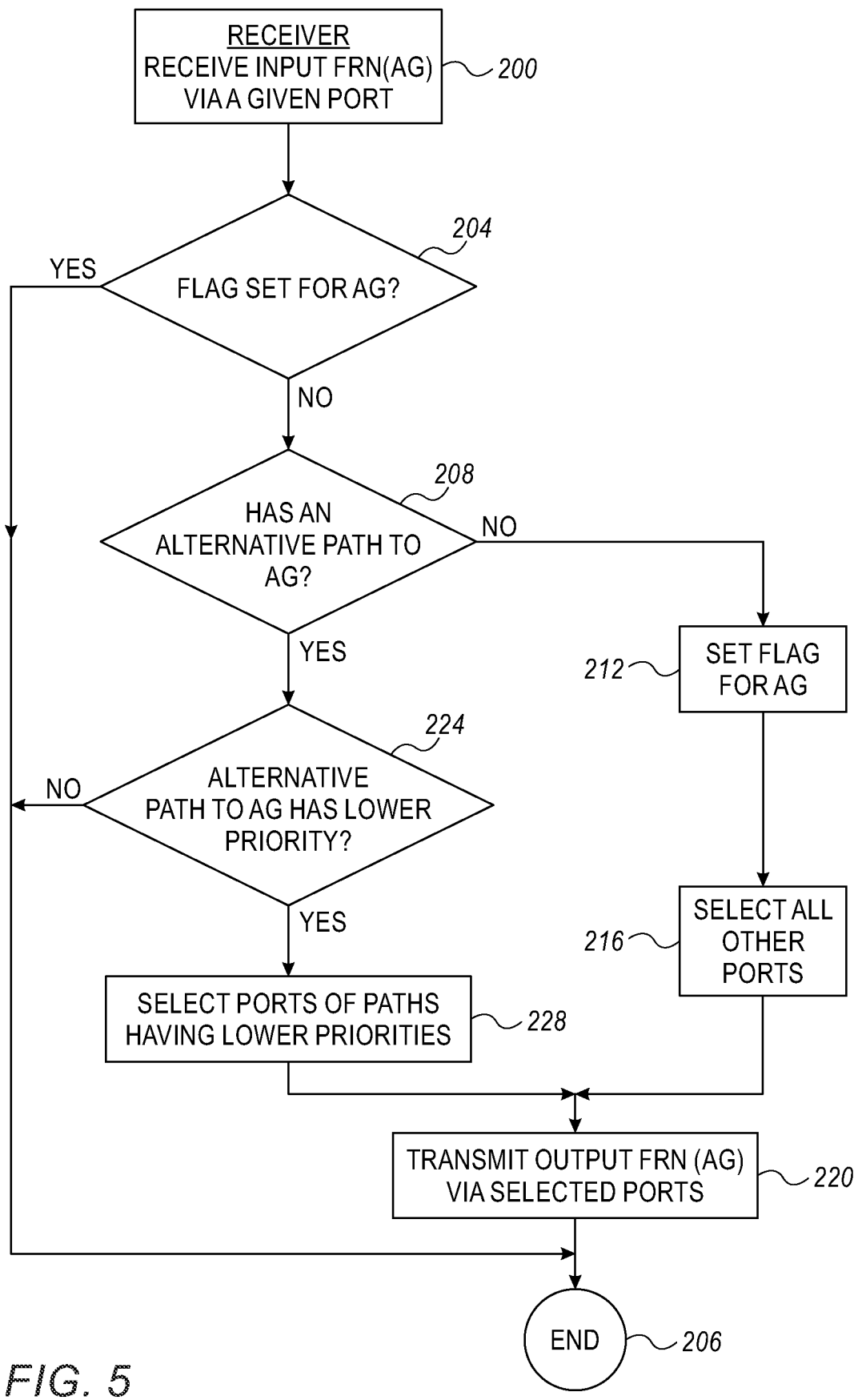
FIG. 5 is a flow chart that schematically illustrates a method for notifying of a link failure based on priorities assigned to alternative paths, in accordance with an embodiment that is described herein.

FIG. 5 is a flow chart that schematically illustrates a method for notifying of a link failure based on priorities assigned to alternative paths, in accordance with an embodiment that is described herein. The method is described for a receiver network element.

It is assumed that ports of the network element are preassigned high and low priorities as described above.

The method begins with processing logic 68 receiving from a neighbor network, via a given port, a FRN(AG) reporting an AG that became unreachable via the given port, at an FRN reception step 200. In this example, the FRN reports a single AG. In alternative embodiments, the FRN may report multiple AGs that share an alternative path.

At a flag checking step 204, the processing logic checks whether the flag associated with the reported AG is already set, and if so, proceeds to a termination step 206, at which the method terminates. Otherwise, the flag of AG is cleared, and the processing logic proceeds to an alternative path query step 208.

At step 208 the processing logic checks whether the network element has an alternative path to the reported AG, and if not, proceeds a flag setting step 212, to set the flag associated with the reported AG. At an all-ports selection step 216, the processing logic selects all the ports other than the given port, and at a transmission step 220 the processing logic transmits FRN(AG) via the selected ports. Following step 220, the method terminates at step 206.

When at step 208 the network element has an alternative path to the reported AG, the processing logic proceeds to a priority checking step 224. At step 224, the processing logic checks whether the priority of the alternative path of step 208 is lower than the priority of the path via the faulty link. When the alternative path has a higher or equal priority compared to the priority of the path via the faulty link, the processing logic starts using this alternative path, and proceeds to termination step 206. Otherwise, the processing logic selects the ports connected to paths having lower priorities than the path via the faulty link, at a lower-priority selection step 228, and transmits FRN(AG) via the selected ports, at step 220. Following step 220 the method terminates at step 206.

As will be described below, the priority-based approach retains some paths that are eliminated with the shortest path approach.

Although the method of FIG. 1 is described for a receiver network element, the method applies similarly to an initiator network element. In this case, step 200 is replaced with an alternative step (e.g., 200' not shown) at which the initiator identifies that a given port associate with an AG has failed.

Recovering from a Link Failure in a Dragonfly Plus Topology

In this section, the shortest path and the priority-based approaches are applied to a DragonFly Plus topology.

Figure 6A:
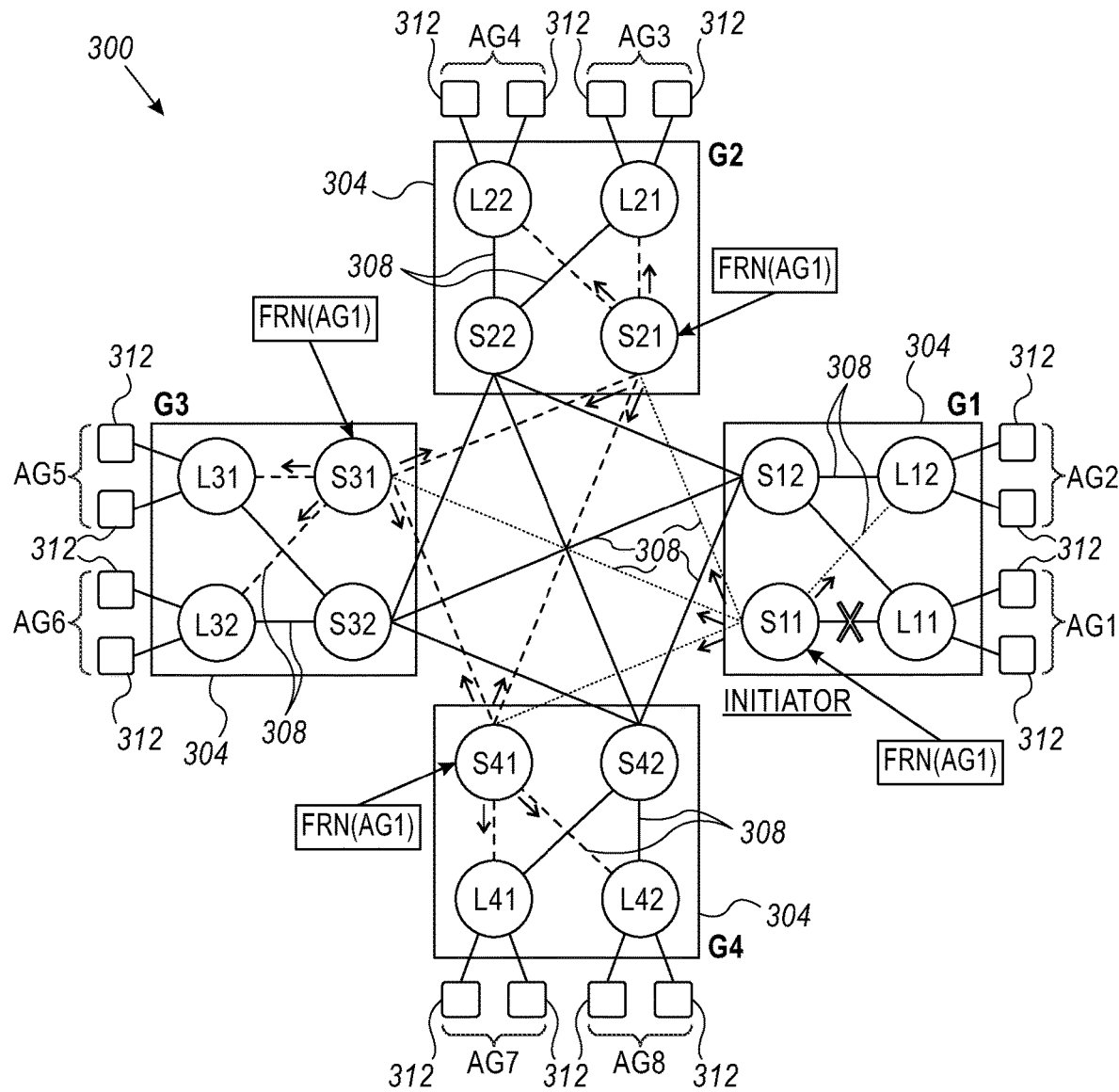
FIGS. 6A, 6B and 6C are diagrams that schematically illustrate methods for recovering from a link failure in a communication network having a DragonFly Plus topology, in accordance with embodiments that are described herein.
Figure 6B:
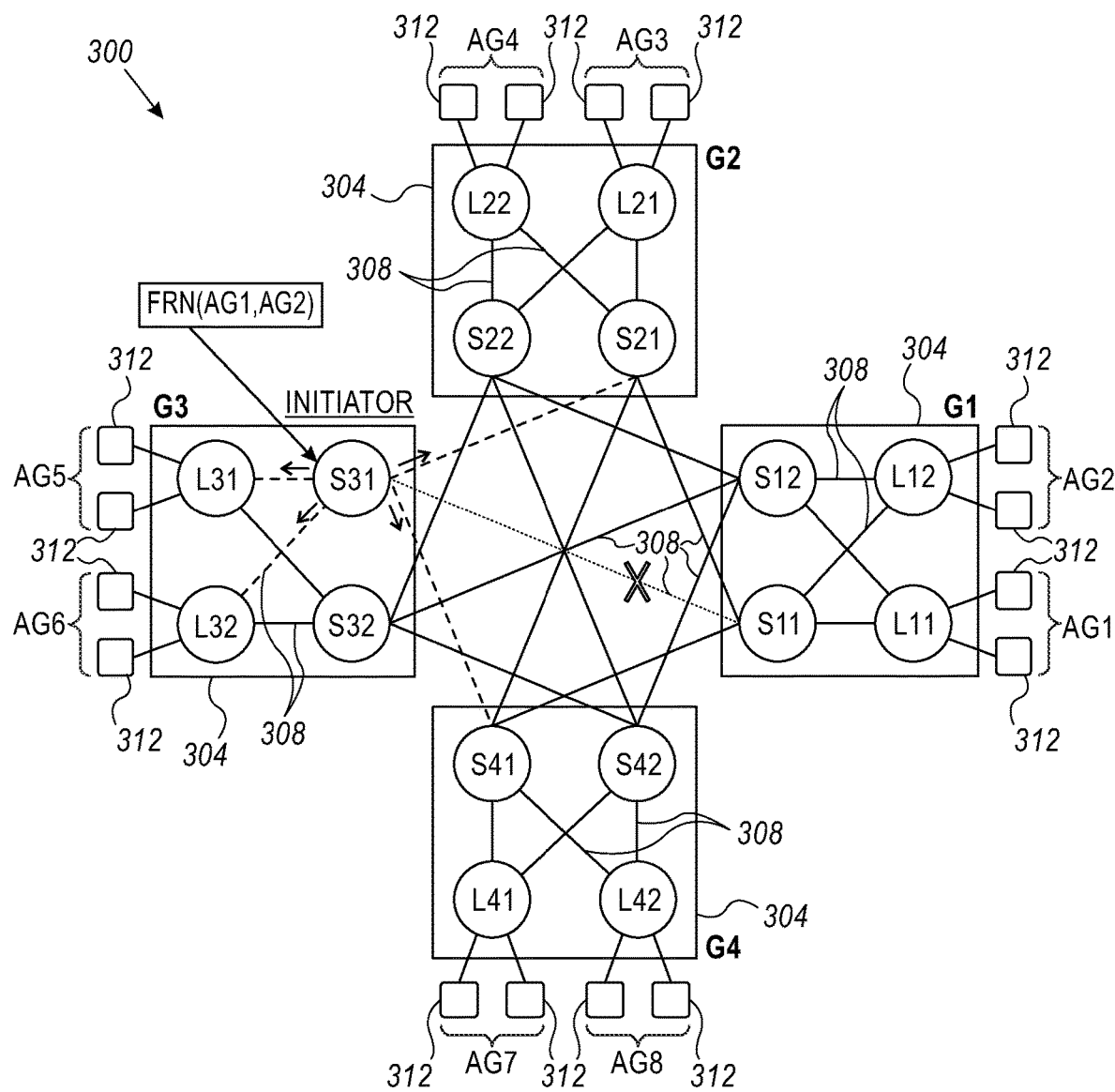
Figure 6C:
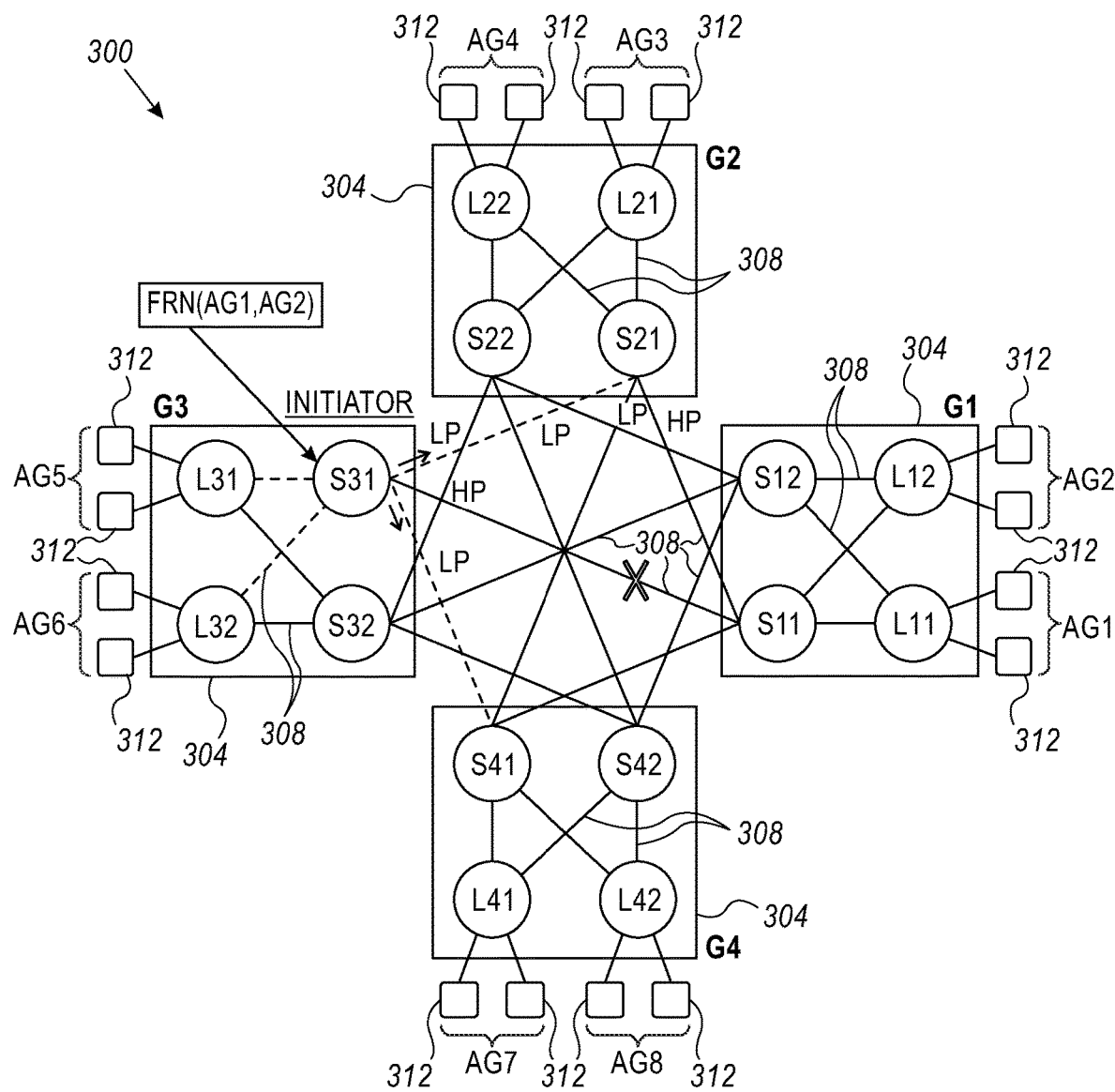

FIGS. 6A, 6B and 6C are diagrams that schematically illustrate methods for recovering from a link failure in a communication network 300 having a DragonFly Plus topology, in accordance with embodiments that are described herein. The Dragonfly Plus (DF+) topology, is described, for example, in "Dragonfly+: Low Cost Topology for Scaling Datacenters," Conference: HiPINEB 2017 The 3rd IEEE International Workshop on High-Performance Interconnection Networks in the Exascale and Big-Data Era, At Austin, Tex., USA, February, 2017.

In the examples of FIGS. 6A, 6B and 6C, the DragonFly Plus topology comprises four groups 304 denoted G1 . . . G4, each of which comprising leaf network elements denoted Li1 and Li2 and spine network elements denoted Si1 and Si2, wherein 'i' denoted the $i^{th}$ group Gi. Network elements 34 within the groups and among different groups are connected using links 308. In FIGS. 6A, 6B and 6C only part of the links are numbered 308, for the sake of figure clarity.

In the description that follows, leaf and spine network elements are also referred to simply as "leaves" and "spines" for brevity. In practical applications, a DragonFly Plus topology may comprise any suitable number of groups, each of which comprising any suitable numbers of spines and leaves.

In the present example, the spines and leaves within each of the groups G1 . . . G4 are interconnected in a fully connected bipartite topology, i.e., each spine connects to all leaves and each leaf connects to all spines in the group. A bipartite topology can also be viewed as a 2-level Fat-Tree (FT) topology. Network nodes 312 are connected only to the leaves. In alternative topologies, a spine connects to a partial subset of the leaves in that group, and/or a leaf connects to a partial subset of the spines can also be used.

In the DragonFly Plus topology, the groups connect to one another using spines. Specifically, each spine in a given group connects to a spine in each of the other groups. For example, spine S11 in G1 connects to S21 in G2, to S31 in G3 and to S41 in G4.

In the present example, each leaf connects to two network nodes belonging to a common AG. For example, leaf L11 in group G1 connects to network nodes whose destination addresses belong to an address group denoted AG1, and leaf L12 connects to network nodes whose destination addresses belong to an address group denoted AG2.

Next are described link-failure scenarios in the DragonFly Plus topology that are recoverable using the shortest path approach, e.g., using the method of FIG. 3, with step 116 modified as described above.

Assume that in FIG. 6A, the link between S11 and L11 of group G1 has failed. Consequently, S11 cannot forward traffic to the network nodes whose destination addresses belong to AG1. In some embodiments, in response to detecting the faulty link, S11 excludes forwarding traffic to L11 from its forwarding table. Moreover, since S11 has no alternative path to AG1, S11 (i) sends a FRN(AG1) to all of its neighbors and (ii) sets the flag associated with AG1. In this example, S11 sends FRN(AG1) to S21, S31, S41 and L12.

L12 receives the FRN(AG1) but since it has an alternative shortest path to AG1 (via S12), L12 sends no further FRNs. None of S21, S31 and S41 has an alternative shortest path to AG1. As a result, each of S21, S31 and S41 sends a FRN(AG1) to all of its neighbors via ports other than the port via which the FRN(AG1) was received. For example, S21 of group G2 sends a FRN(AG1) to L21 and L22 within G2, to S31 in G3 and to S41 in G4.

The leaves in G2, G3 and G4 have alternative shortest paths to AG1. In response to the FR4(AG1), each of S21, S31 and S41 sets its flag of AG1, and therefore will ignore further FRNs(AG1), if received.

After recovering from the faulty link, a network node coupled to L31, for example, can send traffic to a network node in AG1, via L31 and S32 of G3, and further via S12 and L11 of G1. Longer paths that include, e.g., S22 of G2 or S42 of G4 can also be used.

In the example of FIG. 6B, the link between S11 of group G1 and S31 of group G3 has failed. Consequently, S31 cannot send traffic to S11 via a direct link. In this case, both AG1 and AG2 have become unreachable via S31 directly to S11.

In some embodiments, in response to detecting the faulty link, S31 excludes from its forwarding table forwarding traffic to S11 via the faulty link. Moreover, since S31 has no alternative shortest path to AG1 and AG2, S31 (i) sends a FRN(AG1, AG2) to all of its neighbors and sets the flags associated with AG1 and AG2. In this example, S31 sends FRN(AG1, AG2) to L31 and L32 in G3, and to S21 in G2 and to S41 in G4.

In response to receiving FRN(AG1, AG2), each of L31 and L32 updates its forwarding table to block forwarding traffic to S31. Moreover, L31 and 132 have shortest paths to AG1 and AG2 and therefore do not propagate any FRNs. For example, L31 has a shortest path to AG1 and AG2 via S32, S12, and L11.

In response to receiving FRN(AG1, AG2) from S31, S21 blocks forwarding traffic to S31. S21 thus remains with a shortest path to (AG1, AG2) via S11, and with a longer path to (AG1, AG2) via S41 and S11. In this case, since S21 has a shortest path to (AG1, AG2), S21 does not send any further FRNs.

It can be seen in the example of FIG. 6B, that the shortest path method may result in unnecessary elimination of certain paths. For example, the path from network nodes in AG5 to network nodes in AG1 that includes S31 is eliminated, even though this path could in principle be used to bypass the faulty link.

In FIG. 6C, the link between S31 and S11 has failed, as described in FIG. 6B above. Unlike FIG. 6B in which the shortest path approach is used, in FIG. 6C, the priority-based method of FIG. 5 is used.

In FIG. 6C, a port having a shortest path to a destination AG is assigned a high priority, denoted "HP" in the figure, whereas a port having a non-shortest path to that AG is assigned a low priority, denoted "LP" in the figure. For example, to send traffic to address groups AG1 and AG2, S31 has a high priority port to a shortest path via S11 (before the link fails), and two low priority ports to respective non-shortest paths via S21 and S41. As another example, S21 has a high priority port having a path to AG1 and AG2 directly via S11, a low priority port having path to AG1 and AG2 via S41 and S11, and another low priority port having a path to AG1 and AG2 via S31, S41 and S11.

In accordance with the method of FIG. 5 above, a network element sends FRNs only to the ports having low priority paths among the alternative paths to the AG in question. In FIG. 6C, in response to detecting that the link of the port having a high priority path to AG1 and AG2 has failed, S31 sends FRN(AG1, AG2) via the low priority ports to S21 and S41. Since paths from S31 to AG1 and AG2 via L31 or L32 are invalid, S31 does not send FRNs to L31 and L32, and therefore paths from L31 and L32 to S32 remain active.

Each of S21 and S41 receives FRN(AG1, AG2) from S31 and blocks forwarding traffic to AG1 and AG2 via S31. Moreover, since each of S21 and S41 has a high priority port having a shortest path to AG1 and AG2, the network elements S11, S21 and S41 do not send any further FRNs.

In the example of FIG. 6C, after recovering from the faulty link (e.g., after the protocol converges), a network node in AG5 can send traffic to network nodes in AG1 and AG2 via a path comprising L31, S31, S21, S11 and L11. Such a path is eliminated using the shortest path approach, as described above.

In the DragonFly Plus topology the network diameter is 3, which bounds the convergence time. Let R denote the radix of the switches in the topology, e.g., in FIGS. 6A and 6B. For an intra group link failure (e.g., FIG. 6A) the total number of FRNs sent is upper bounded by R/2*(R−1). For an inter group link failure (e.g., FIG. 6B) the total number of FRNs sent is upper bounded by 2*(R−1).

Recovering from a Link Failure in an Xpander Topology

Figure 7:
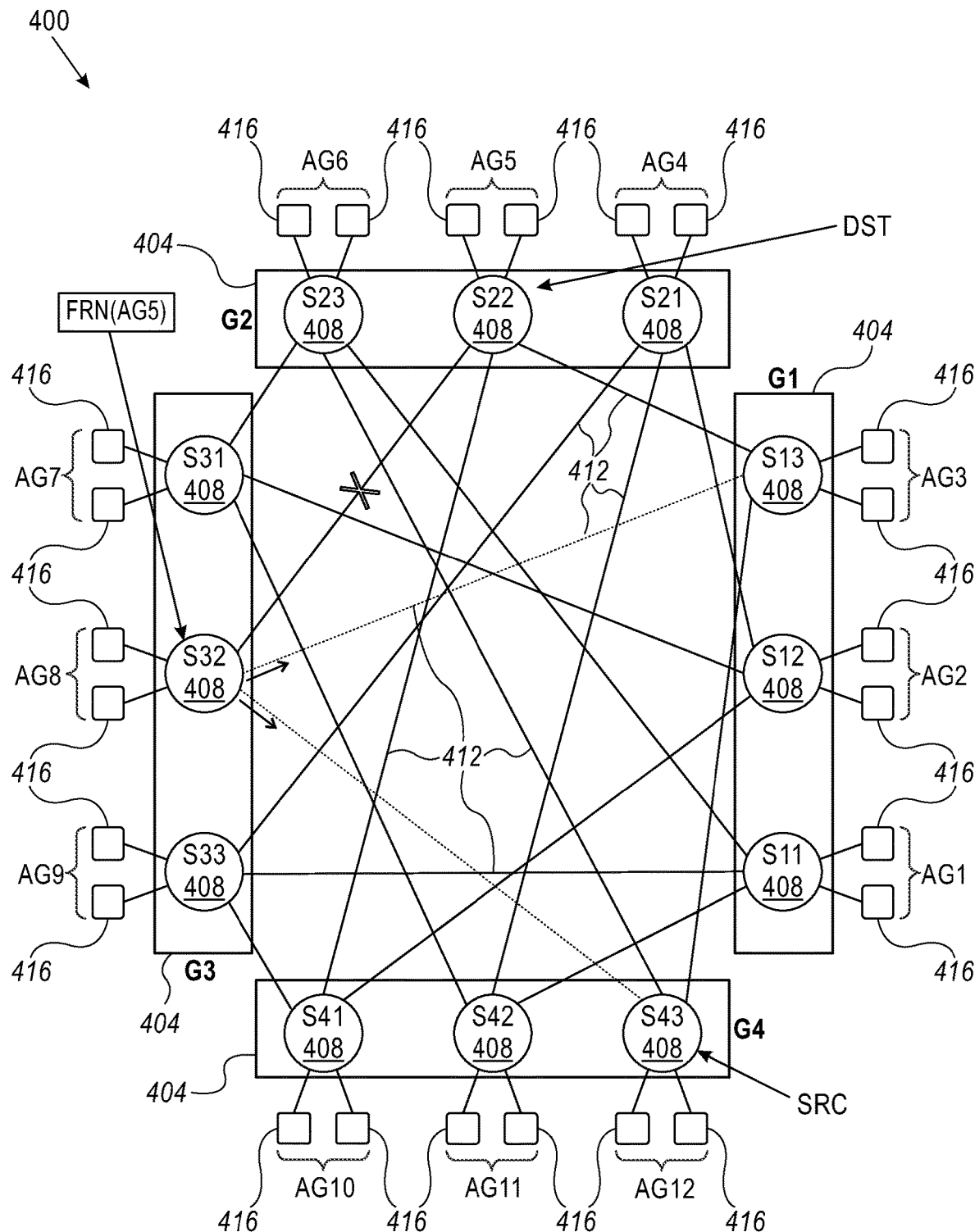
FIG. 7 is a diagram that schematically illustrates a method for recovering from a link failure in a communication network having an Xpander topology, in accordance with an embodiment that is described herein.

FIG. 7 is a diagram that schematically illustrates a method for recovering from a link failure in a communication network 400 having an Xpander topology, in accordance with an embodiment that is described herein.

The Xpander topology is described, for example, by Valadarsky et al., in "Xpander: Towards Optimal-Performance Datacenters," CoNEXT '16: Proceedings of the 12th International on Conference on emerging Networking Experiments and Technologies, December 2016, pages 205-219.

The Xpander topology comprises multiple groups 404 comprising network elements 408 that are interconnected using links 412. Each network element in each group connects to respective network elements in all other groups. In the present example, the Xpander topology comprises four groups denoted G1 ... G4, wherein the $i^{th}$ Gi group comprises network elements denoted Sij, j=1 ... 3. In practical Xpander networks, however, other suitable numbers of groups and numbers of network elements per group can also be used.

In communication network 400, network nodes 416 are coupled to network elements 408. In the present example, each network element 408 connects to two network nodes 416. In other embodiments, however, other suitable numbers of network nodes per network element can also be used. Network nodes that connect to a common network element belong to a common AG. For example, network nodes 416 whose destination addresses belong to AG1 are connected to S11. In the example of FIG. 7, the network nodes are arranged in twelve AGs denoted. AG1 ... AG12.

In the Xpander topology of FIG. 7, a network element can send traffic to another network element over three disjoint paths. For example, consider S43 in G4 sending traffic to S22. A first path comprises S43, S32 and S22, a second path comprises S43, S23, S31, S12, S41 and S22, and a third path comprises S43, S13 and S22.

Consider a scenario in which the link from S32 to S22 fails. This means that due to the link failure the network nodes belonging to AG5 are unreachable via S32. Assuming that a link failure is recovered using the method of FIG. 3 above, upon detecting the faulty link, S22 as an initiator sends FRN(AG5) to its neighbors S13 and S43. Upon receiving FRN(AG5), each of S13 and S43 excludes from its forwarding table (72) the possibility of forwarding packets to S32. Both S13 and S43, however, have alternative paths to AG5 and therefore do not send any further FRNs.

In some embodiments, the forwarding tables of network elements 408 are configured to forward packets only via paths having a length of one or two hops to the final network element. In such embodiments, the only valid paths from S43 to S22 (before any link failure occurs) are via S32 or via S13. In this case, after receiving FRN(A5) from S32, S43 can reach S22 only via S13.

With Xpander topologies, the notification protocol (e.g., based on the method of FIG. 3) converges after a single hop of FRNs propagation. The total number of FRNs sent is given by (R−1), wherein R denotes the radix of the switches in the topology.

Although the embodiments described in this section mainly address the Xpander topology, the method in FIG. 7 is also applicable in a similar manner to other Expander topologies such as, for example, the FlimFly and the Jellyfish topologies. The SlimFly topology is described, for example, by Besta et al. in "Slim fly: A cost effective low-diameter network topology," SC'14: Proceedings of the International Conference for High Performance Computing, Networking, Storage and Analysis, pages 348-359, IEEE, 2014. The Jellyfish topology is described, for example, by Singla et al., in "Jellyfish: Networking data centers randomly," the 9th {USENIX} Symposium on Networked Systems Design and Implementation ({NSDI} 12), pages 225-238, 2012.

The embodiments described above are given by way of example, and other suitable embodiments can also be used.

It will be appreciated that the embodiments described above are cited by way of example, and that the following claims are not limited to what has been particularly shown and described hereinabove. Rather, the scope includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A network element, comprising:
   multiple ports to connect using links to a communication network; and
   processing circuitry, to:
      receive packets via the ports and forward the received packets to respective destination addresses via the ports, wherein the destination addresses are organized in address groups, each address group comprising multiple destination addresses of end nodes connected to a common network element in the communication network;
      receive via a given port a notification reporting one or more address groups that became unreachable via the given port due to a link failure in another network element; and
      upon determining one or more address groups in the received notification that are unreachable via any port of the network element, transmit an output notification reporting the determined address groups via one or more ports other than the given port,
   wherein the processing circuitry is further to assign, for a given address group, a high priority to ports having shortest paths to the given address group, to assign a low priority to ports having non-shortest paths to the given address group, and, in response to receiving a notification that includes the given address group, to send a corresponding output notification reporting the given address group only via ports that are assigned to the low priority for the given address group.

2. The network element according to claim 1, wherein the processing circuitry is to, upon determining that a given address group in the notification is reachable via an alternative path, refrain from including the given address group in the output notification, and forward subsequent received packets that are addressed to the given address group via the alternative path.

3. The network element according to claim 1, wherein the processing circuitry is to, in response to the notification, refrain from forwarding packets to be delivered to the determined address groups, via the given port.

4. The network element according to claim 1, wherein the processing circuitry is to receive a first notification followed by a second notification, wherein both the first and the second notifications report a given address group that became unreachable via respective first and second ports, and in response to the first notification, to send an output notification reporting the given address group, via the second port, before receiving the second notification.

5. The network element according to claim 1, wherein the processing circuitry is to report in the output notification address groups that are reachable only via ports having non-shortest paths to the respective address groups.

6. The network element according to claim 1, wherein the communication network comprising a topology selected from a list of topologies comprising: a Fat-Tree topology, a Clos topology, a DragonFly Plus topology, and an Xpander topology.

7. A method, comprising:
   in a network element that comprises multiple ports for connecting using links to a communication network, receiving packets via the ports and forwarding the received packets to respective destination addresses via the ports, wherein the destination addresses are organized in address groups, each address group comprising multiple destination addresses of end nodes connected to a common network element in the communication network;
   receiving via a given port a notification reporting one or more address groups that became unreachable via the given port due to a link failure in another network element; and
   upon determining one or more address groups in the received notification that are unreachable via any port of the network element, transmitting an output notification reporting the determined address groups via one or more ports other than the given port,
   wherein the method further comprising assigning, for a given address group, a high priority to ports having shortest paths to the given address group, assigning a low priority to ports having non-shortest paths to the given address group, and, in response to receiving a notification that includes the given address group, sending a corresponding output notification reporting the given address group only via ports that are assigned to the low priority for the given address group.

8. The method according to claim 7, and comprising, upon determining that a given address group in the notification is reachable via an alternative path, refraining from including the given address group in the output notification, and forwarding subsequent received packets that are addressed to the given address group via the alternative path.

9. The method according to claim 7, and comprising, in response to the notification, refraining from forwarding packets to be delivered to the determined address groups, via the given port.

10. The method according to claim 7, and comprising receiving a first notification followed by a second notification, wherein both the first and the second notifications report a given address group that became unreachable via respective first and second ports, and in response to the first notification, sending an output notification reporting the given address group, via the second port, before receiving the second notification.

11. The method according to claim 7, and comprising reporting in the output notification address groups that are reachable only via ports having non-shortest paths to the respective address groups.

12. The method according to claim 7, wherein the communication network comprising a topology selected from a list of topologies comprising: a Fat-Tree topology, a Clos topology, a DragonFly Plus topology, and an Xpander topology.

* * * * *